United States Patent [19]

Kinghorn

[11] Patent Number: 4,719,510
[45] Date of Patent: Jan. 12, 1988

[54] TELETEXT DECODERS

[75] Inventor: John R. Kinghorn, Ashtead, England

[73] Assignee: U.S. Philips Corporation, New York, N.Y.

[21] Appl. No.: 916,920

[22] Filed: Oct. 9, 1986

[30] Foreign Application Priority Data

Oct. 16, 1985 [GB] United Kingdom ............... 8525436

[51] Int. Cl.$^4$ ............................................. H04N 7/04
[52] U.S. Cl. ................................... 358/147; 358/142
[58] Field of Search ............... 358/147, 146, 142, 141, 358/160

[56] References Cited

U.S. PATENT DOCUMENTS

| 4,394,687 | 7/1983 | Hutt et al. | 358/147 |
| 4,593,374 | 6/1986 | Gurumurthy | 358/147 X |
| 4,620,227 | 10/1986 | Levin et al. | 358/147 |
| 4,636,858 | 1/1987 | Hague et al. | 358/147 |
| 4,638,497 | 1/1987 | Komatsu et al. | 358/147 X |
| 4,820,227 | 10/1986 | Levin et al. | 358/147 |

Primary Examiner—James J. Groody
Assistant Examiner—Victor R. Kostak
Attorney, Agent, or Firm—Thomas A. Briody; William J. Streeter; Marianne R. Rich

[57] ABSTRACT

A teletext decoder for full-channel operation includes a "row-found" register in which a flag is put for each data row which is actually present in a selected teletext page that is received and stored in the page memory of the decoder. The decoder further includes control means which on read-out from the page memory allows the utilisation of only those data rows of the stored page for which there is a flag in the "row-found" register. Because teletext pages can contain different numbers of data rows, it is normally necessary to empty the page memory before a selected new page is received and stored since otherwise data rows of a stored old page which are not over-written by corresponding data rows of the new page would be included in the data read out for the new page. The provision of a flag for each received data row of the new page and the action of the control means prevents this happening. It then becomes unnecessary to delay reception of a new page until an old page has been removed from the page memory. Means are also provided for taking account of parity errors in received character data codes.

8 Claims, 5 Drawing Figures

TELETEXT DECODERS

BACKGROUND OF THE INVENTION

1. Field of the Invention

This invention relates to teletext decoders for receiving, storing and processing teletext information which is transmitted as digitally coded data and comprises a plurality of different pages each of which is identified by a respective page number. Current transmissions of teletext information are in television signals in television lines where no picture signals representing normal picture information are present.

2. Description of the Prior Art

The document "Broadcast Teletext Specification", September 1976, published jointly by the British Broadcasting Corporation, Independent Broadcasting Authority and British Radio Equipment Manufacturers' Association, discloses a specification for a television transmission of the above type for use in 625-line television systems.

In the above-identified document "Broadcast Teletext Specification", a quantity of teletext information to be considered as an entity is termed a page and will be so termed hereinafter. All of thepages which are available are normally transmitted in a recurrent cycle, with or without up-dating page information, as appropriate. At a teletext decoder any page can be selected, and the digitally coded data representing the page information is then acquired by the teletext decoder from the cyclic transmission and is stored in a page memory of the teletext decoder for as long as the page is required. The pages are organised into different magazines and each page consists of up to 24 data rows each having 40 character positions. The first data row (Row 0) of each page is termed a page-header and contains inter-alia the page number. The transmission of each page begins with, and includes, its page-header and ends with, and excludes, the next page-header which is transmitted in respect of a page in the same magazine. Thus, it is assumed that all of the data rows containing the relevant magazine number which are transmitted between two such successively transmitted different page-headers belong to the page having the first page-header. The assumption avoids the need to include in each data row data for identifying the page to which the row belongs. Also, there is row-adaptive transmission in that data rows containing no information are not transmitted. Because different groups (magazines) of pages use the same range of page numbers, so that more than one page can have the same page number within that range, and bacause, as transmitted, the pages from different magazines may have their data rows interleaved, each data row also includes data which identifies the magazine containing the page that the row belongs to.

It is also a requirement of said "Broadcast Teletext Specification" that the data for an entire data row is contained in a single television line that is used for transmitting teletext information. Such a television line is termed a data-line and will be so termed hereinafter. The "Broadcast Teletext Specification" further specifies that only data-lines in the vertical or field-blanking intervals (VBI) should be used for transmitting teletext information. Initially, teletext transmissions in the United Kingdom used television lines 17 and 18 in odd fields and television lines 330 and 331 in even fields as data-lines, but current teletext transmissions in the United Kingdom now use six television lines in each field as data-lines. The VBI transmission is thus, in effect, multiplexed with the normal picture transmission and the teletext information transmitted in this way and representing data for display such as text and graphics can be displayed at a teletext television receiver as a selectable alternative to the normal picture information.

The said "Broadcast Teletext Specification" provides a page erasure interval by specifying, in effect, that rows of a page will be transmitted such as to allow an active television field period between the transmission of a page-header of a page and the transmission of subsequent data rows for the page. This interval, which is 20 ms. in 625-line television systems, allows time for a teletext decoder to respond to receipt of the page-header of a new page selected by a viewer to erase from its page memory any previously acquired page that is already stored therein, before the data rows of the new page are received. The page memory is thus made ready to store the data rows of thenew page as transmitted in the data-lines of field-blanking intervals subsequent to the field-blanking interval in which the page-header was transmitted. This provision simplifies teletext decoder design by allowing the operation of the teletext decoder to be relatively slow.

If the data of an 'old' page in the page memory is not erased before a 'new' page is stored therein, the resulting total data would include any data rows of the 'old' page that have not been over-written by corresponding data rows of the 'new' page. In other words, one or more spurious data rows would occur in every stored 'new' page that did not contain the full 24 data rows.

A proposed extension of teletext transmission is for "full-channel" operation in which all of the television lines of each field of a TV channel are employed for transmitting teletext information. Thus, a complete TV channel, which can be an over-air broadcast channel or a cable channel, is dedicated to teletext transmission.

If a teletext specification adopted for "full-channel" operation included the 20 ms. page erasure interval discussed above, then after the transmission of a page-header of a particular page in one television (data) line, 312 subsequent data-lines would have to occur before the first data row of that page could be transmitted. This means that the flexibility and usable capacity of a TV channel dedicated to "full-channel" operation would be severely restricted. For instance, for a serial mode of page transmission in which the pages are transmitted sequentially with all the data rows of each page being transmitted successively between the page-header for the page and the page-header for the next page, only about 10% of the total capacity of the channel would be usable.

Therefore, for efficient "full-channel" operation, a teletext transmission is required in which data rows of a page can be transmitted immediately after the transmission of the page-header of the page. In other words, in the most extreme case, the first data row of a page should be transmitted in the next data-line following the data-line in which the page-header for the page is transmitted. However, this reduces an effective minimum page erasure interval for a teletext decoder to approximately 40 $\mu$s, (i.e. the period in a data-line that contains the page-header data) and this poses the problem of making the teletext decoder operate fast enough after recognition of a selected page in one data-line to clear its page memory in time to store the first data row of the selected page as received in the immediately following data line.

Patent specification GB No. 2 115 258 A discloses an image display apparatus for the Japanese multi-character broadcast or CAPTAIN system which can be characterised as a teletext system in which information is transmitted utilising the vertical blanking period of a television broadcast. This patent specification is directed to the problem of fast erasure of a page of data in a page memory so that the page memory becomes available very quickly for storing the data of a new page. The solution to this problem involves the detection by the image display apparatus of an erasing code which is sometimes included in a page control packet (analogous to a page-header). When the erasing code is detected in the control packet for a 'new' page, a flag is set in the apparatus for each portion (row or dot line) of an 'old' page to be erased from the page memory. These flags are then reset progressively as the data for the 'new' page is received in subsequent television fields. Whilst a flag is set, 'blanks' are written for display instead of the portion of the 'old' page to which the flag pertains. Once a flag has been reset the appertaining portion of the 'new' page is written for display. The effect of this solution is that the page memory does not have to have the data of the 'old' page emptied from it before it can start receiving the data of the 'new' page.

SUMMARY OF THE INVENTION

It is an object of the present invention to provide in a teletext decoder a means of circumventing the same problem, but without the need to receive a special page erasure code in the page-header of a 'new' page.

According to the invention there is provided a teletext decoder for teletext information comprising pages which are transmitted in a recurrent cycle, each page comprising a plurality of data rows containing character data codes, of which rows the first data row as transmitted includes the page number and each data row includes an individual row address; said teletext decoder comprising means for selecting a page by its page number, means for detecting a selected page number when received, and a page memory for storing the character data codes in each received data row of a selected page in respective character locations of a respective memory portion which is identified by the row address of the data row, the page memory being a random access memory which character data codes can be written into and read from at the respective character locations and each data code can over-write and thereby replace any data code already written into its character location by a previous writing action; and said teletext decoder being characterised by further comprising control means for permitting utilisation of only the stored data rows of the selected page, said control means comprising a "row-found" register having an individual flag position for each possible data row that a page can have, together with means for re-setting this register in response to the detection of the page number of a selected page, means for entering a flag into the relevant flag position for each received data row of the selected page, and means for producing an inhibiting signal in respect of any data row that does not have a flag in the flag position for that data row.

The provision of the control means avoids the need to erase previously stored data in the page memory before the data for a new page is written into it. Of course, the character locations of any memory portions in the page memory that have not had data codes for the relevant data row of the new page written into them, may still contain old data codes previously written-in. However, these old data codes are not utilised spuriously for the corresponding data row(s) of the new page because of the action of the control means.

The teletext decoder is made ready to receive a new page immediately after the "row-found" register has been reset. Assuming a maximum of 23 data rows (plus the page-header) per page, and assuming that each flag position of the register is a single bit position, then only 23 bit positions have to be emptied before new data can be received and stored in the page memory. In comparison, (assuming 7-bit character data codes) an existing decoder would have to clear $23 \times 7 \times 40 = 6440$ bit positions to achieve the same result. The "row-found" register may have a permanently set flag position for the data row that contains the page number, i.e. the page-header (Row 0).

The "row-found" register may be composed of a plurality of latches which form the individual flag positions of the register. Alternatively, a portion of a memory device which forms the page memory may serve as the "row-found" register.

In an existing form of teletext decoder, erasure of the page memory is effected by writing into each character location the data code for a blank space. Subsequently, as the character data codes of a selected page are received, they over-write the "space" data code in the relevant character locations. A further feature of this existing form of teletext decoder is that each character data code that is received is checked for parity. If there is a parity error then the data code is rejected on that reception of it by a write inhibit condition. If the data code has previously been received with correct parity, then the data code will already be stored in the relevant character location of the page memory. If it has not been received, then the data code for the blank space will be stored in that location.

In order to preserve this feature of storing the data code for a blank space at character positions for which no character data codes have been received correctly, a teletext decoder according to the invention may include means which are operable such that, following the detection of a selected page, a parity error in the first reception of a character data code will cause the data code for a blank space to be written into the page memory at the character location concerned, whereas on subsequent receptions of the character data code a parity error will cause a write inhibit condition to obtain.

BRIEF DESCRIPTION OF THE DRAWINGS

In order that the invention may be more fully understood reference will now be made by way of example to the accompanying drawings, of which.

DESCRIPTION OF THE PREFERRED EMBODIMENTS

Figure 1:
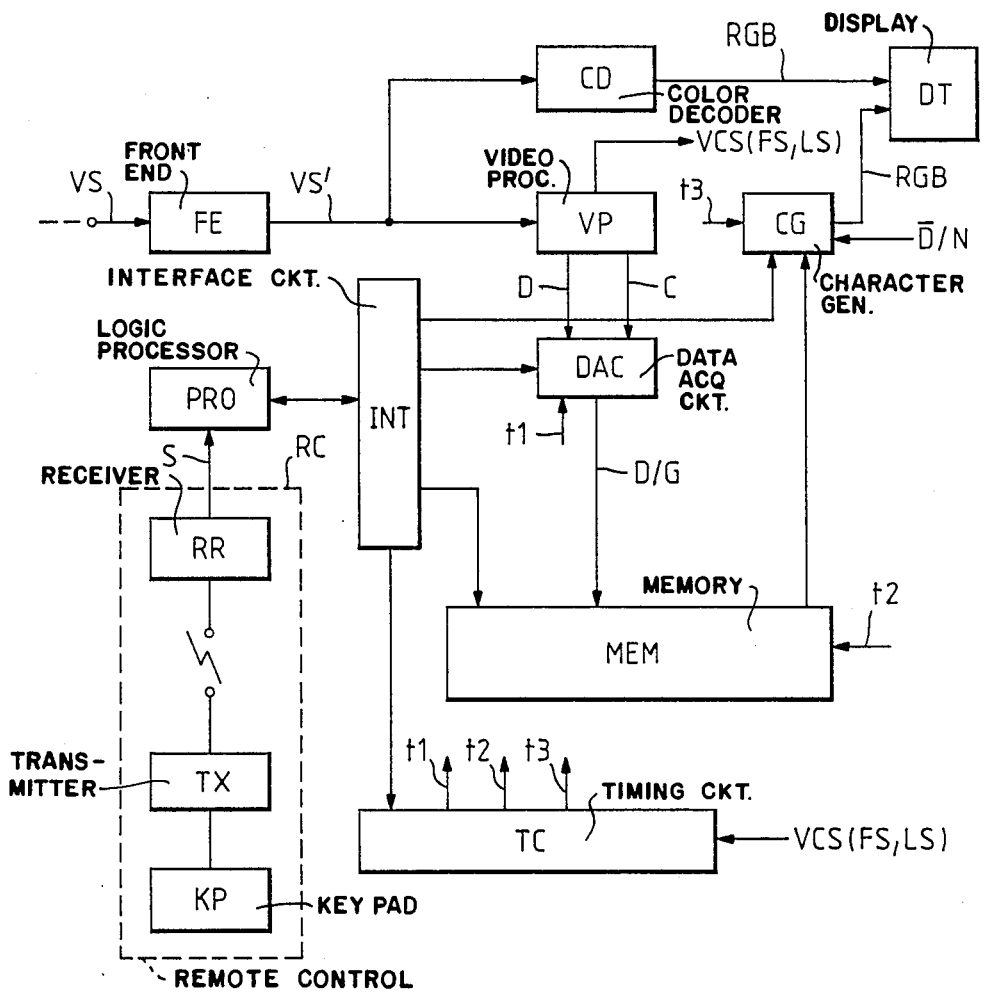
FIG. 1 is a block diagram of a teletext television receiver including a teletext decoder in which the invention can be embodied.

Referring to the drawings, the teletext television receiver shown in FIG. 1 comprises video and data processing circuits for receiving and displaying both normal picture information and teletext information. The front end FE of the receiver comprises the usual amplifying, tuning and i.f. detector circuits, and is connected to receive an incoming television video signal VS. For normal picture display by the television receiver, the demodulated video signal VS' is applied to a colour decoder which produces the R, G and B component signals for the picture display. Time base circuits for a display tube DT receive the usual line and field synchronising pulses from a sync. separator circuit which extracts these synchronising pulses from the video signal VS'. The element CD represents the colour decoder and these other circuit elements which are provided for conventional picture display.

The demodulated video signal VS' is also applied to a teletext decoder section of the teletext television receiver which deals with the receipt and display fo the alpha-numeric text and other teletext information that is received in digitally coded form. This section comprises a video processor circuit VP which performs inter alia data slicing for retrieving teletext data pulses D from the video signal VS'. The video processor VP also produces input data clock pulses C from the data pulses D. The data pulses D are fed together with the clock pulses C to a data acquisition circuit DAC which is operable to feed selected groups D/G of the teletext data pulses to a memory MEM as address and display information. The memory MEM has a capacity for storing at least one page of information, comprising a plurality of data rows. The page and row format laid down in the aforementioned "Broadcast Teletext Specification" is assumed.

A logic processor PRO is opeable in accordance with select signals S applied to it from a remote control arrangement RC to control which grups of teletext data pulses D/G are acquired by the data acquisition circuit DAC. The arrangement RC has a receiver part RR and a remote transmitter part comprising a transmitter TX and a keypad KP. The processor PRO is further operable to read out from the memory MEM display information for the selected page, for application to a character generator CG which is responsive to this display information to provide R, G, B component signals for the display. A timing circuit TC provides timing signals on connections t1 to t3 for the circuit elements DAC, MEM and CG. These circuit elements and the timing circuit TC are accessed by the processor PRO via an interface circuit INT. The operation of the timing circuit is synchronised with the received video signal VS by a composite pulse signal VCS which contains the line (LS) and field (FS) synchronising pulses which are separated from the demodulated video signal VS' in the video processor VP.

In the teletext television receiver shown in FIG. 1, only single line connections have been shown for the interconnections between the various circuit elements for the sake of simplicity. However, it will be apparent to a person skilled in the art that in practice most of these interconnections would be multi-line. For instance, whereas the teletext data pulses D retrieved from the video signal VS' would be applied serially to the data acquisition circuit DAC over a single connection, serial-to-parallel conversion would take place within this circuit DAC, so that the groups D/G of teletext data pulses would be applied to the memory MEM in parallel over a multi-line connection. Also, the connection between the processor PRO and the interface circuit INT would be a multi-line bus, for instance, a so-called I$_2$C bus. The processor PRO can be a commercially available microcomputer; e.g. from the MAB 8400 Series (Philips). The circuit elements DAC, CG, TC and INT can be the integrated circuit EURO CCT type SAA 5240 (Mullard). The circuit element VP can be the integrated circuit VIP2 type SAA 5230 (Mullard). Although a composite television receiver for receiving both normal picture information and teletext information is exemplified in FIG. 1, it will be appreciated that the teletext decoder section for data acquisition together with the front end FE may be provided as a separate teletext decoder which is adapted to feed either a CRT display monitor or a conventional television receiver. Also, the teletext information stored in the page memory may be utilised for purposes other than display, depending on its content. For instance, the teletext information can be read from the page memory under the control of the processor for onward transmission over an external data link (not shown) to a computer or other data terminal.

In accordance with the present invention the teletext decoder section of the television receiver of FIG. 1 can include a control means which operates to permit the utilisation of only those data rows stored in the memory MEM that belong to the last selected page.

Figure 2:
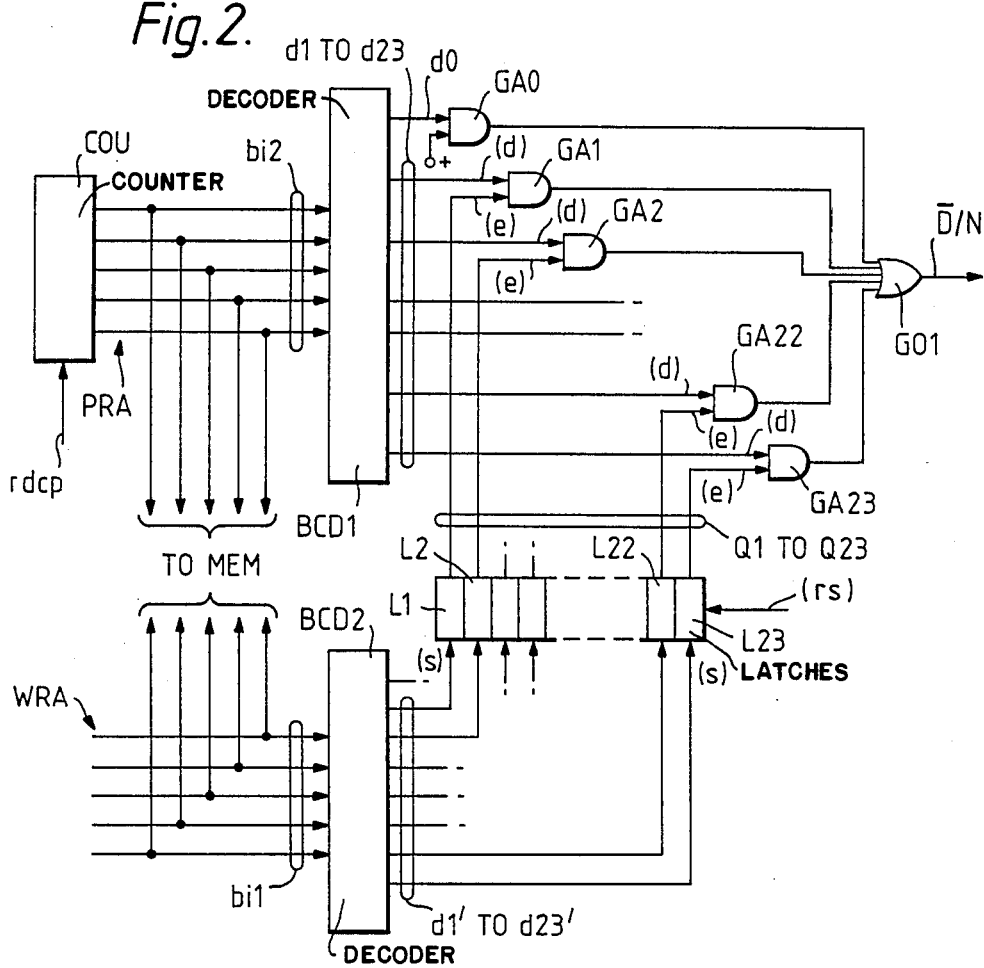
FIGS. 2 and 3 are respective block diagrams of control means for use in the teletext decoder in FIG. 1.

In FIG. 2, one implementation of such a control means comprises a plurality of latches L1 to L23 which pertain respectively to the data rows R1 to R23 of a teletext page. These latches L1 to L23 serve as respective flag positions of a "row-found" register. The control means also comprises a plurality of AND-gates GA1 to GA23 which have 'enabling' inputs (e) connected respectively to the Q-outputs of Q1 to Q23 of the latches L1 to L23. The gates GA1 to GA23 have individual 'data' inputs (d) connected to respective output leads d1 to d23 of a 1-of-24 decoder BCD1. The outputs of the gates GA1 to GA23 are combined by an OR-gate GO1 which produces a control signal $\overline{DN}$ that has a high (active) level during the time that any one of the gates GA1 to GA23 is open to produce a high active output level, the signal $\overline{DN}$ having a low (inactive) level at all times when none of the gates GA1 to GA23 is open.

FIG. 2 also shows a second 1-of-24 decoder BCD2 and a counter COU, the latter being included in the timing circuit (TC - FIG. 1). The decoder BCD2 has a set of binary input leads bi1 to which are applied groups of coded data pulses WRA which form the write row address information in the groups D/G of teletext data pulses produced by the data acquisition circuit DAC and are otherwise applied to the memory MEM. The output leads d1' to d23' of the decoder BCD2 are connected to the 'set' inputs (s) of the latches L1 to L23, respectively. Thus, as the data rows of a selected page are written into the memory MEM, a particular one of the latches L1 to L23 is set for each data row that is present in the page. The row addresses of the memory (MEM - FIG. 1) are subsequently addressed to read out the data rows of the selected page for display or other utilisation. This addressing is effected by groups of coded data pulses PRA which form read row address information and which are produced sequentially by the counter COU in response to a row clock pulse rdcp. The decoder BCD1 has its set of binary input leads bi2 addressed by the row address information PRA and is responsive to produce a control signal on each of its output leads d1 to d23 in turn. For the data rows that are actually present in the selected page stored in the memory, only the corresponding latches L1 to L23 will be set and only those of the AND-gates GA1 to GA23 which are enabled by the set latches will open to pass the control signal to the OR-gate GO1 to provide the control signal $\overline{DN}$ with a high active level. When the teletext information is for display on a local display device, the signal $\overline{DN}$ is used to allow display to occur when it has a high active level and to inhibit display when it has a low active level. Suitably, in the receiver of FIG. 1 the signal $\overline{DN}$ can be used to turn on or turn off the R, G, B component signals produced by the character generator CG. Alternatively, the signal $\overline{DN}$, when it has a high active level, can be used to force the character generator CG to display a blank space, as will be described. When a request for a new page is made (or the memory is otherwise to receive fresh page information) a reset signal is applied to the 'reset' inputs (rs) of all the latches L1 to L23 to reset them to their non-flag condition. In order to allow data in Row 0 (page-header) always to be utilised, an extra gate GAO is provided which is permanently enabled from a reference point (+). This gate is open each time the row address information for Row 0 causes the decoder BCD1 to produce a control signal on the output lead do.

Figure 3:
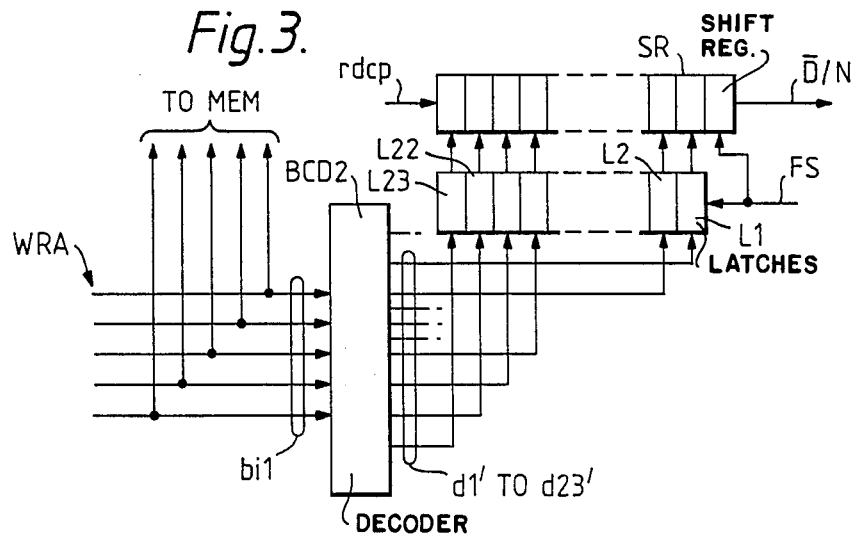

A second implementation of the control means shown in FIG. 3 also includes the latches L1 to L23 and the second decoder BCD2, so that when a page is written into the memory MEM, the latches corresponding to the data rows actually present in the page are set to the flag position. Instead of the first decoder and AND-gates (BCD1, GA1 . . . GA23), there is now provided a shift register SR having an individual position for each of the latches. This shift register SR is stepped by the row clock pulse rdcp and its output signal forms the control signal $\overline{DN}$. The condition (set or reset) of the latches is loaded into the corresponding positions of shift register SR by the field sync. pulse FS. As each row clock pulse rdcp occurs in the following field, the data row concerned is utilised or not, according as the output signal $\overline{DN}$ from the shift register SR has a high active level or a low active level. The shift register SR has an additional position which is provided in respect of Row 0 and is always set directly by the field sync. pulse FS.

Figure 4:
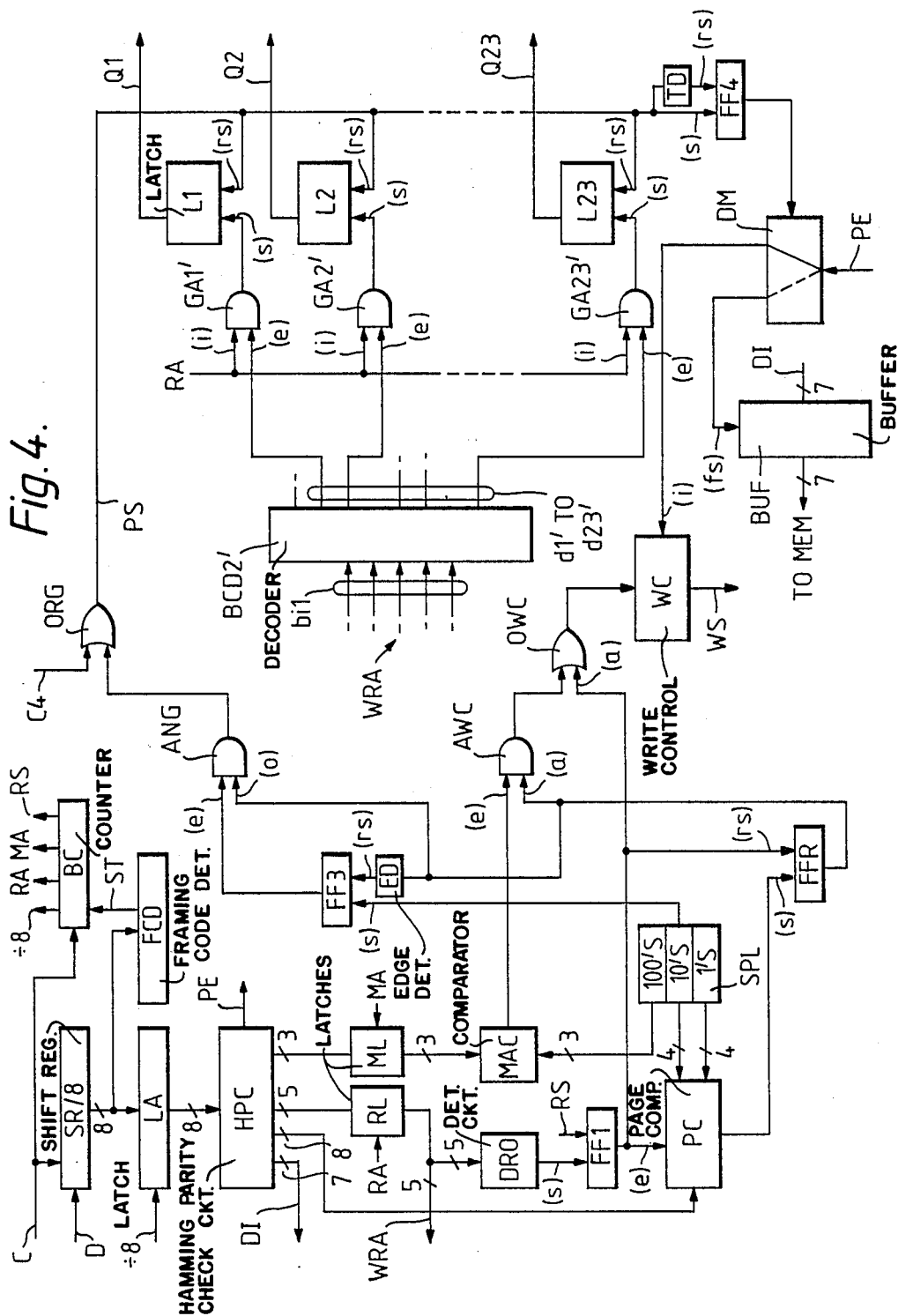
FIG. 4 is a block diagram showing elements of the teletext decoder in FIG. 1 with further elements for implementing the invention.

The arrangement represented by the block diagram of FIG. 4 extends the operation of control means according to the invention by including the means whereby a parity error in the first reception of a character data code will cause a space to be written into the character location concerned, whereas on subsequent receptions of the character data code a parity error will cause a write inhibit condition to obtain. The block diagram of FIG. 4 shows elements of the data acquisition circuit (DAC - FIG. 1) as well as elements of the control means. More specially, the received teletext data pulses D are clocked into an 8-bit shift register SR/8 by the clock pulses C. In the aforesaid "Broadcast Teletext Specification", each teletext data row includes for byte synchronization an 8-bit framing code. This framing code is looked for by a framing code detector FCD and when it is found, this indicates the start of proper data on a teletext data-line and a 'start' signal ST is applied by the detector FCD to a data bit counter BC. The bit counter BC is clocked by the clock pulses C and thus counts through the teletext data bits as they are clocked into the input shift register SR/8. Various decodes from this bit counter BC provide pulses to other parts of the data acquisition circuit at certain times during the data-line. One of these decodes provides a signal ($\div 8$) every eight clock pulses, and is used to clock an 8-bit latch LA. The serial teletext data stream is thus broken up into 8-bit words.

Seven of the eight bits of words from the latch LA form teletext information DI to be stored in the memory MEM. The eighth bit is a parity bit, which is not stored because parity is checked by a Hamming and parity checker HPC. Whenever a parity error occurs the checker HPC produces a "parity error" signal PE. The first two 8-bit words after the framing code on each data line are the magazine address and row address group. These contain the row address and magazine address which are protected by Hamming codes. The data passes through the checker HPC, and Hamming corrected data (two 4-bit words) is clocked into row and magazine address latches RL and ML by pulses RA and MA from the bit counter BC.

The 'row address' output from the latch RL (5 bits) is the write row address information WRA which is used, as aforesaid, to determine where the teletext information DI is to be stored in the memory MEM. The 'row address' output from the latch RL is also applied to a detector DRO which can detect the address of Row 0. When Row 0 (i.e. a page-header) is detected, the detector DRO produces a signal which 'sets' (s) a flip-flop FF1. The resulting signal from the flip-flop FF1 'enables' (e) a page comparator PC, 'resets' (rs) a second flip-flop FF2, and 'activates' (a) a write control element WC via an OR-gate OWC. When activated, the element WC produces a 'write' signal WS to permit data in the detected page-header (Row 0) to be written into the memory MEM.

The 'magazine address' output from the latch ML (3 bits) is compared in a magazine address comparator MAC with a selected magazine address input which is, in effect, the 'hundreds' digit of a selected page number which has been entered by a user into a selected page latch SPL. If there is correspondence between the two magazine numbers, the comparator MAC produces a signal which 'enables' (e), a first input of an AND-gate AWC, allowing possible continued activation of the write control element WC beyond the reception of Row 0.

The information in the page-header (Row 0) following the magazine and row address group is page information containing two 4-bit words (after Hamming correction) which give the 'tens' and 'units' digits of the page number contained in the page-header (Row 0). The page comparator PC compares these two digits with the 'tens' and 'units' digits of the page number stored in the latch SPL, and if there is correspondence the page comparator PC produces a signal which 'sets' the flip-flop FF2. Provided that the 'enable' signal from the comparator MAC is present, the resulting output signal from the flip-flop FF2 'activates' (a) the write control element WC (by opening the gate AWC) for all the following data-lines that contain the data rows of the selected page, until receipt of the next page-header (Row 0) causes the flip-flop FF2 to be reset by the flip-flop FF1 and thereby terminate the writing action.

The writing into the memory MEM of the data in each following data row is conditional upon the presence of the 'enable' signal from the magazine address comparator MAC. This ensures that when the rows of pages of different magazines are interleaved, only those data rows with the correct magazine number are accepted.

The flip-flop FF1 is reset at the end of every data line by a 'reset' pulse RS from the bit counter BC.

The arrangement of FIG. 4 also includes a third flip-flop FF3 which is 'set' (s) by a signal from the page selector latch SPL when a selected page number is initially entered therein. When set, the flip-flop FF3 it produces a signal which 'enables' (e) a first input of an AND-gate ANG. As soon as the flip-flop FF2 has been set on recognition of the selected page, it supplies a signal to 'open' (o) the gate ANG. An edge detector ED is operated by the leading edge of this output signal to 'reset' (rs) the flip-flop FF3, so that the gate ANG is open only briefly after flip-flop FF2 is set. The resulting signal at the output of gate ANG is applied through an OR-gate ORG as a pulse signal PS to 'set' (s) a fourth flip-flop FF4. Equivalently, the flip-flop FF4 can be 'set' (s) by a pulse signal PS produced from the gate ORG in response to a control bit (C4) which is contained in the page-header (Row 0) at a bit position after the page number bits. The purpose of this control bit is to allow a transmitting authority to initiate erasure of a page already stored in the page memory of the teletext decoders so as to allow for instance, for the new reception of the same page which contains updated information.

When the flip-slop FF4 is set by the pulse signal PS it switches a demultiplexer DM. This demultiplexer DM is normally in a condition in which it supplies a signal which 'inhibits' (i) the write control element WC, in response to a parity error signal PE as produced by the checker HPC when there is a parity error in a received data code for a character. This 'inhibit' signal prevents writing into the relevant character position of the memory MEM. However, when the demultiplexer DM is switched, it applies instead a 'force space' (fs) signal to a buffer BUF via which 7-bit words forming the teletext information DI are fed from the checker HPC for storage into the memory MEM. The effect of this signal (fs) is to cause the data code for a blank space to be written into the memory MEM at the character position concerned, instead of the error data code. This means that any data code already in the character position (because data in the memory MEM is not erased before the new page is stored) is over-written as a blank space. A time delay circuit TD is responsive to the pulse signal PS to produce a signal which 'resets' (rs) the flip-flop FF4 after a delay (e.g. 2 seconds) which is long enough for the first full reception of the selected page, but before any subsequent reception of the selected page occurs. The demultiplexer DM then reverts to its original condition, so that writing is now inhibited for subsequent receptions of character codes of the selected page that do not satisfy parity.

The pulse signal PS is also used to reset (rs) the 'row-found' latches L1 to L23. The Q-outputs Q1 to Q23 of the latches control the production of the display control signal $\overline{DN}$ in the manner already described with reference to FIG. 2 or FIG. 3. In the present arrangement these latches L1 to L23 are set by the output signals of AND-gates GA1' to GA23' which are 'enabled' (e) by respective output signals from a decoder BCD2' which, like the decoder BCD2 in FIG. 2, is connected to receive the row address information WRA of the selected page at its binary input bi. The row address pulse RA produced by the bit counter BC 'interrogates' (i) the gates GA1' to GA23' once per row period and the gate that is enabled opens to set the relevant 'row found' latch.

Figure 5:
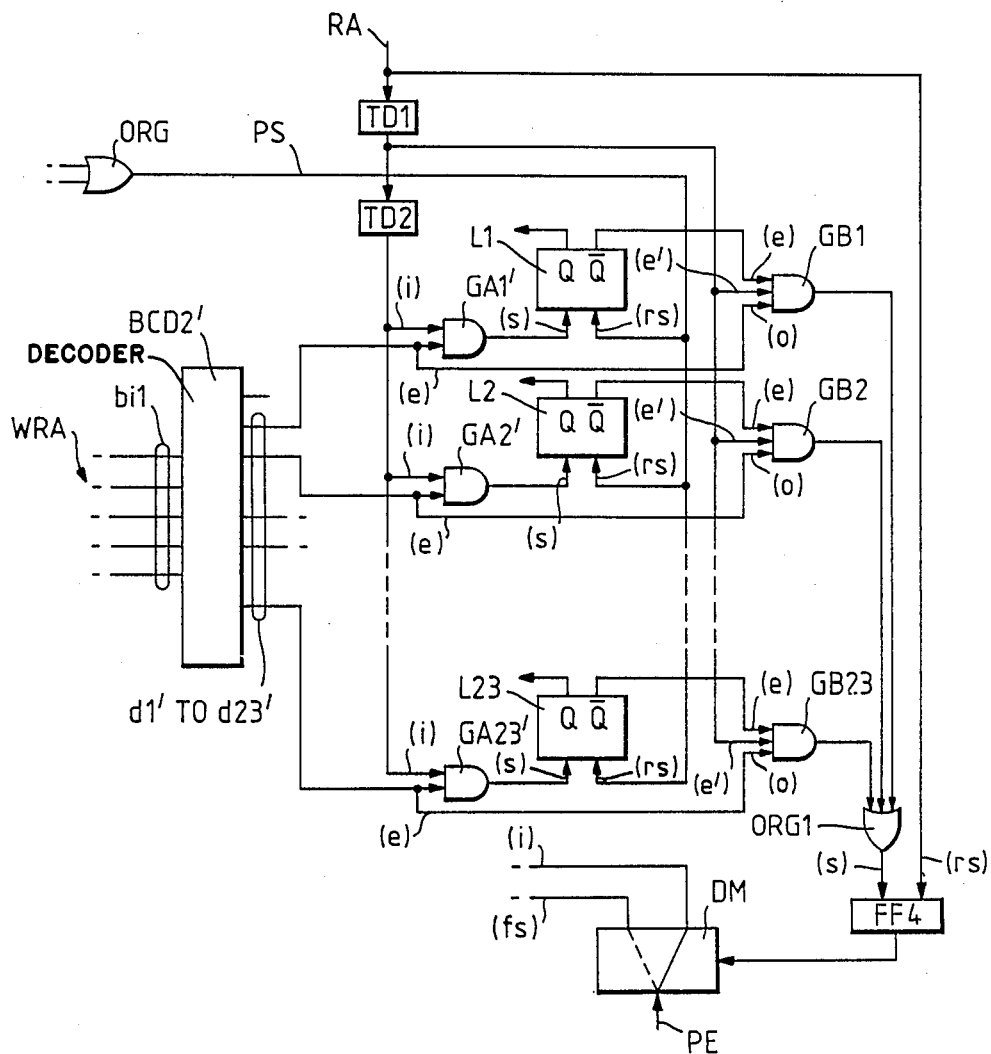
FIG. 5 is a block diagram illustrating a modification of the invention.

FIG. 5 shows a modification of FIG. 4: elements which are common to both FIGS. 4 and 5 have been given the same references. In the modification of FIG. 5, there is provided a further set of AND-gates GB1 to GB23 which are associated respectively with the latches L1 to L23. Also, the row address pulse RA is now applied to the second inputs of the original gates GA1' to GA23' via two delay circuits TD1 and TD2 in series. The row address pulse RA is now also used to reset (rs) the flip-flop FF4. The operation of this modification is as follows. When a newly selected page has been found the pulse PS resets (rs) the latches L1 to L23, as before. The $\overline{Q}$-outputs of the latches L1 to L23 'enable' (e) a first input of a respective one of the gates GB1 to GB23. In response to the first row address pulse RA, the flip-flop FF4 is reset (rs). After the delay imposed by the delay circuit TD1, the row address pulse RA is applied to 'enable' (e') a second input of all the gates GB1 to GB23. If a row address is received in the row period concerned, then the signal at the relevant output of the decoder BCD2' will 'open' (o) the particular one of the gates GB1 to GB23, resulting in a signal which 'sets' (s) the flip-flop FF4 via an OR-gate ORG1. Thus, the demultiplexer DM is switched to force blank space codes into any character location for which a parity error is detected in a character data code. When the next pulse RS is received, the flip-flop FF4 is reset (rs) and the demultiplexer DM reverts to its original condition to inhibit (i) writing when parity-errors are detected. The signal at the output of the decoder BCD2' also 'enables' (e) the relevant one of the gates GA1' to GA23'. After the delay imposed by the delay circuit TD2 the row address pulse RA interrogates (i) to GA' gates and the gates opens to 'set' (s) the associated 'row found' latch. The Q-outputs Q1 to Q23 of the latches L1 to L23 again control the production of the display control signal $\overline{DN}$. When a latch is 'set' (s), its $\overline{Q}$-output is terminated to close the associated GB gate. Thus, in this modification, the forcing of blank space codes into character locations for parity errors is effected in respect of each row individually, rather than on an overall page basis as in the arrangement of FIG. 4. Each of the delay circuits TD1 and TD2 imposes only a few microseconds delay on the row address pulse RA. This modification allows good performance in the presence of errors to be achieved without any assumptions concerning the page transmission or magazine cycle times.

I claim:

1. A teletext decoder for teletext information comprising pages which are transmitted in a recurrent cycle, each page comprising a plurality of data rows containing character data codes, of which the first data row as transmitted includes the page number and each data row includes an individual row address, said teletext decoder further comprising means for selecting each of said pages by its page number, means for detecting a selected page number when received, and a page memory for storing the character data codes in each received data row of a selected page in respective character locations of a respective memory portion which is identified by the row address of the data row, the page memory being a random access memory into which character data codes can be written and read from at the respective character locations and each data code can over-write and thereby replace and data code already written into its character location by a previous writing action; and said teletext decoder being characterised by further comprising control means for permitting utilisation of only the stored data rows of the selected page, said control means comprising a "row-found" register having an individual flag position for each data row of each page, means for re-setting this register in response to the detection of the page number of a selected page, means for entering a flag into the relevant flag position responsive to each newly received data row of the selected page, and means for producing an inhibiting signal for any data row that does not have a flag in the flag position for that data row.

2. A teletext decoder as claimed in claim 1, characterised in that the "row-found" register has a permanently set flag position for the data row that contains the page number.

3. A teletext decoder as claimed in claim 1, characterised in that the "row-found" register comprises a plurality of latches which form the individual flag positions of the register.

4. A teletext decoder as claimed in claim 1, characterised in that a portion of random access memory which forms the page memory serves as the "row-found" register.

5. A teletext decoder as claimed in claim 1 for receiving teletext information in which said character data codes include a parity bit and the decoder includes means for checking the parity of each received data code, characterised in that the decoder further includes error compensating means which are operable such that, following the detection of a selected page, a parity error in the first reception of a character data code will cause the data code for a blank space to be written into the page memory at the character location concerned, whereas on subsequent receptions of the character data code a parity error will cause a write inhibit condition to occur.

6. A teletext decoder as claimed in claim 5, characterised in that said error compensating means is arranged to be operable at the beginning of a page and to remain operable until after the reception of all the possible data rows of the page.

7. A teletext decoder as claimed in claim 5, characterised in that said error compensating means is arranged to be operable at the beginning of each possible data row of a page and to remain operable only until the end of the data row.

8. A teletext decoder as set forth in claim 1, wherein said decoder is combined with a television receiver for displaying teletext information.

* * * * *